United States Patent

Chen

[11] Patent Number: 5,980,038
[45] Date of Patent: Nov. 9, 1999

[54] ANGULARLY ADJUSTABLE TEMPLES FOR EYEGLASSES

[75] Inventor: Lance Chen, Tainan, Taiwan

[73] Assignee: Crews, Inc., Memphis, Tenn.

[21] Appl. No.: 09/234,416

[22] Filed: Jan. 21, 1999

[51] Int. Cl.⁶ ........................................................ G02C 5/14
[52] U.S. Cl. ............................................. 351/120; 351/119
[58] Field of Search ...................................... 351/111, 113, 351/114, 115, 119, 120, 121

[56] References Cited

U.S. PATENT DOCUMENTS

| | | | |
|---|---|---|---|
| 5,760,867 | 6/1998 | Pernicka et al. | 351/120 |
| 5,812,234 | 9/1998 | Carswell | 351/120 |

Primary Examiner—Huy Mai
Attorney, Agent, or Firm—Edwin E. Greigg; Ronald E. Greigg

[57] ABSTRACT

Angularly adjustable temples are disclosed which can be attached to a pair of eyeglasses. Each temple includes an end which is hinged to the eyeglasses for rotation inwardly along the lens of the glasses. Each temple includes first and second parts having compatible ends that fit together and which are adjustable angularly with respect to each other. One end of the first part includes a shaft disposed between parallel walls and a short pin projecting from one of said walls. The second part includes an end having a jaw member that fits between the parallel walls and is fitted on the shaft. The parallel walls of the first part include a series of serrations thereon which are compatible with a hook-like protrusion on the second part in order to fix the second temple part at an adjusted angle relative to the first temple part.

5 Claims, 4 Drawing Sheets

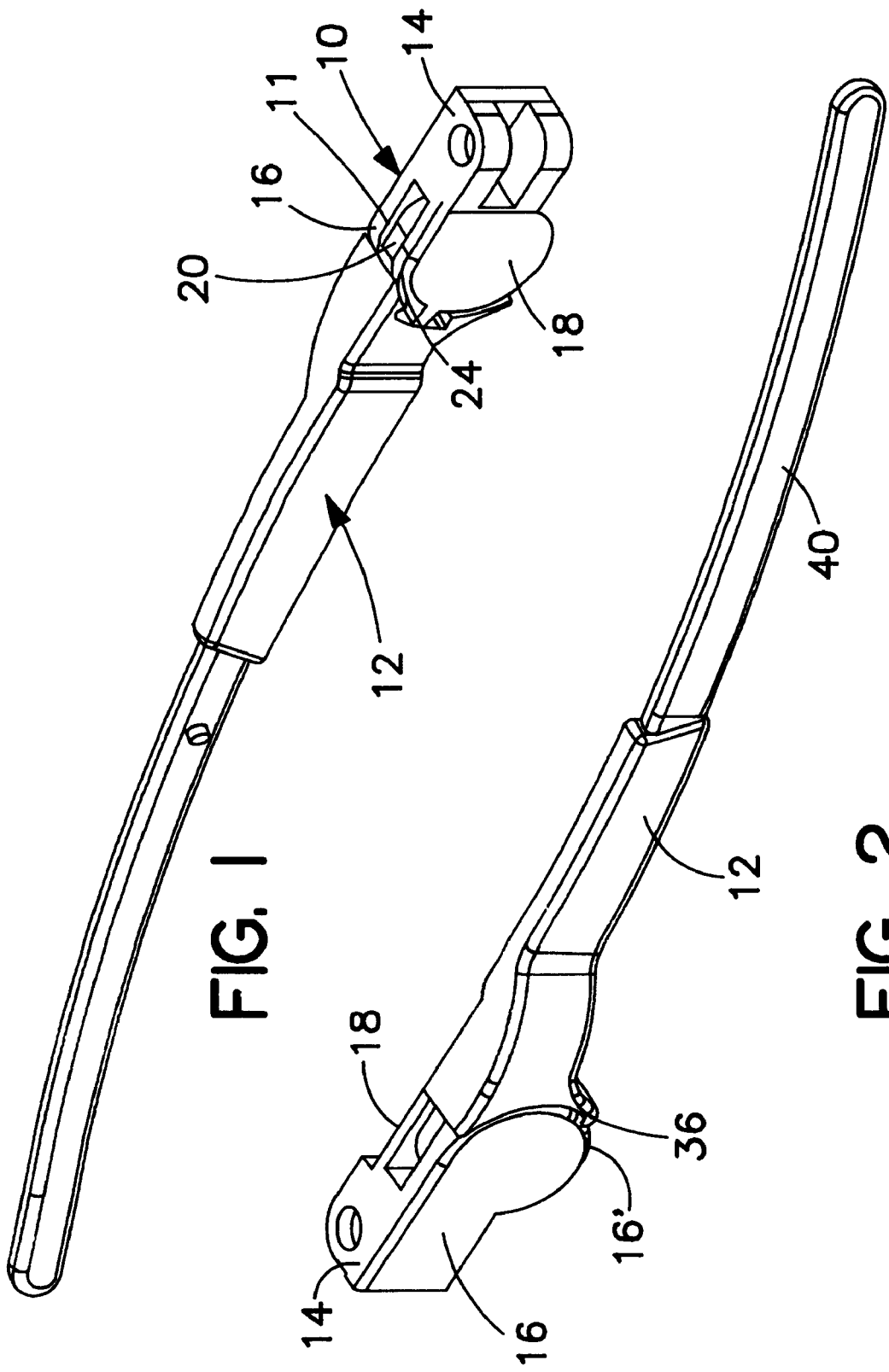

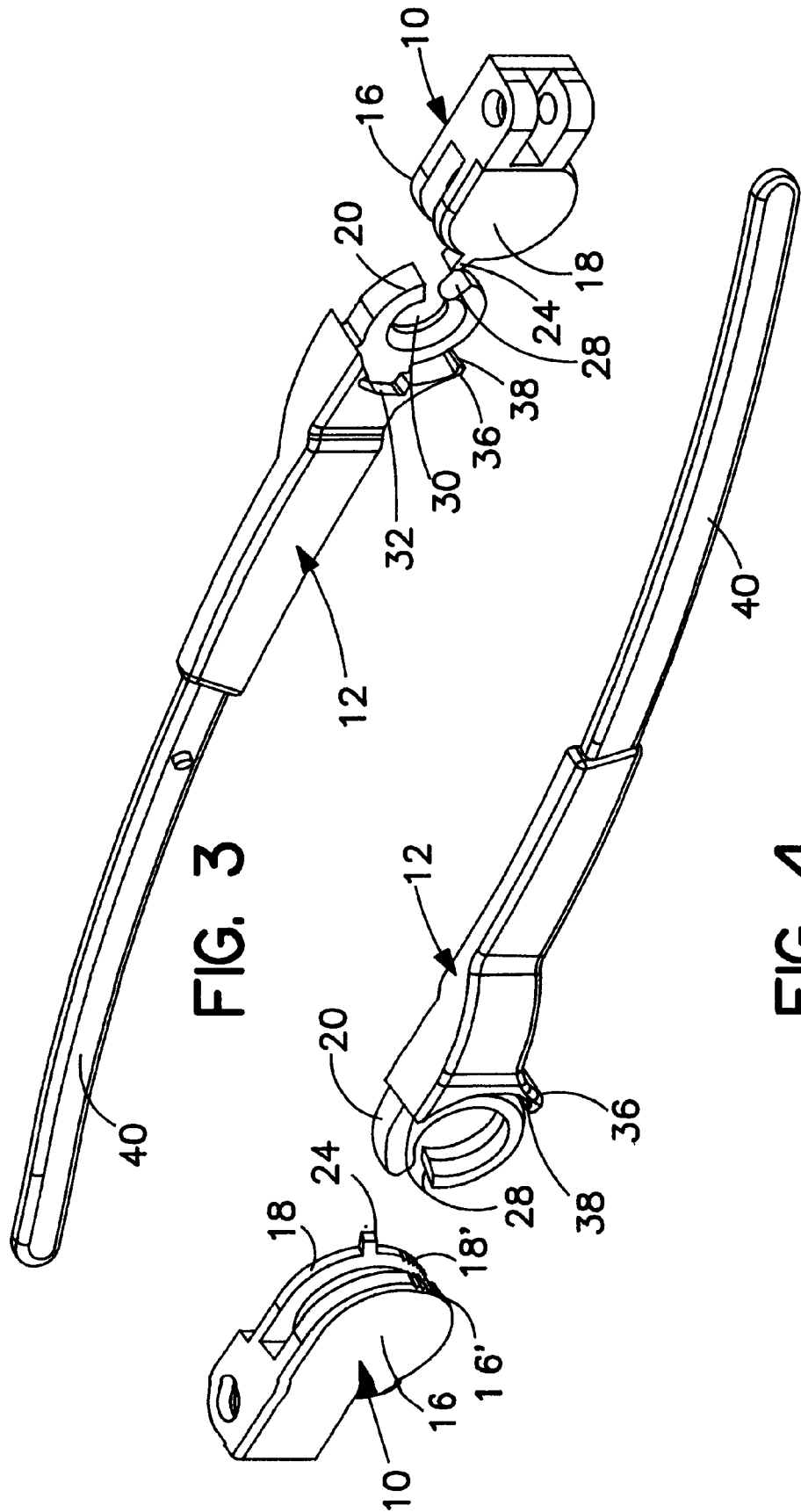

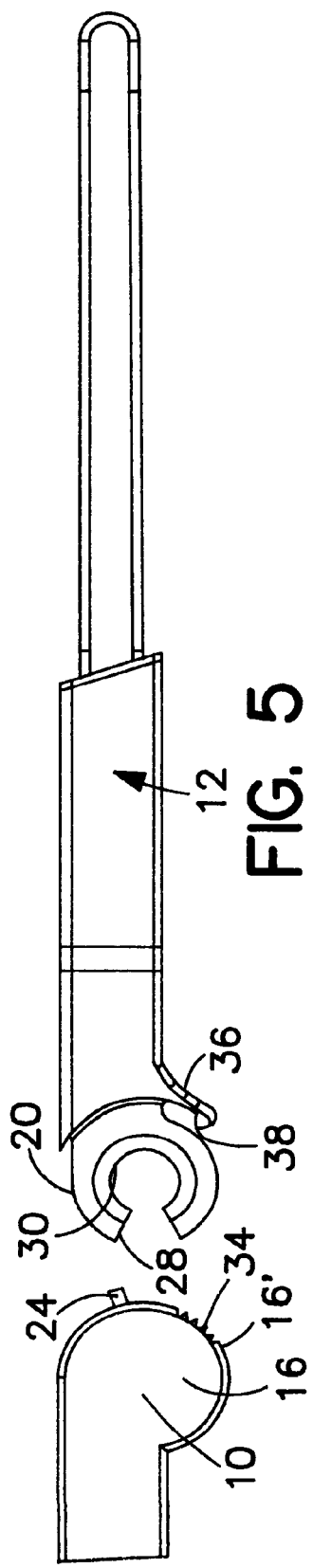
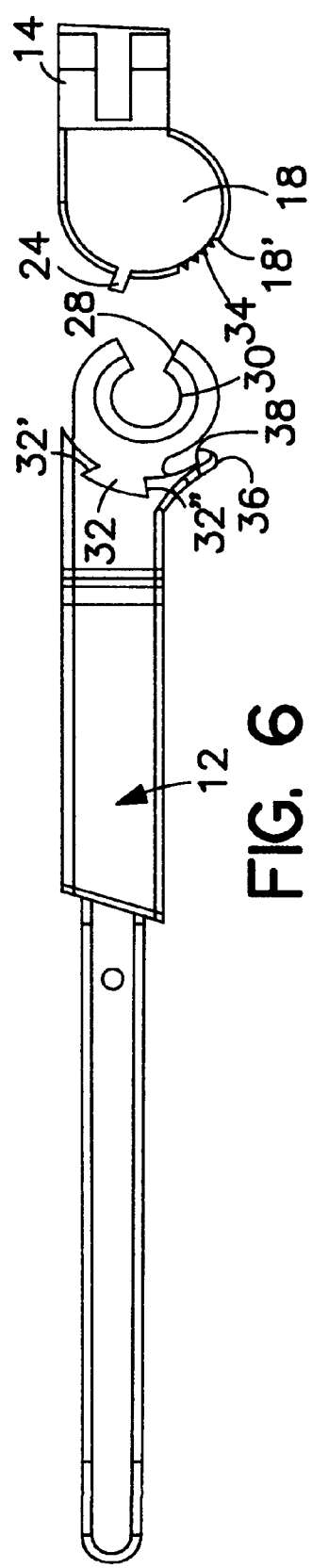

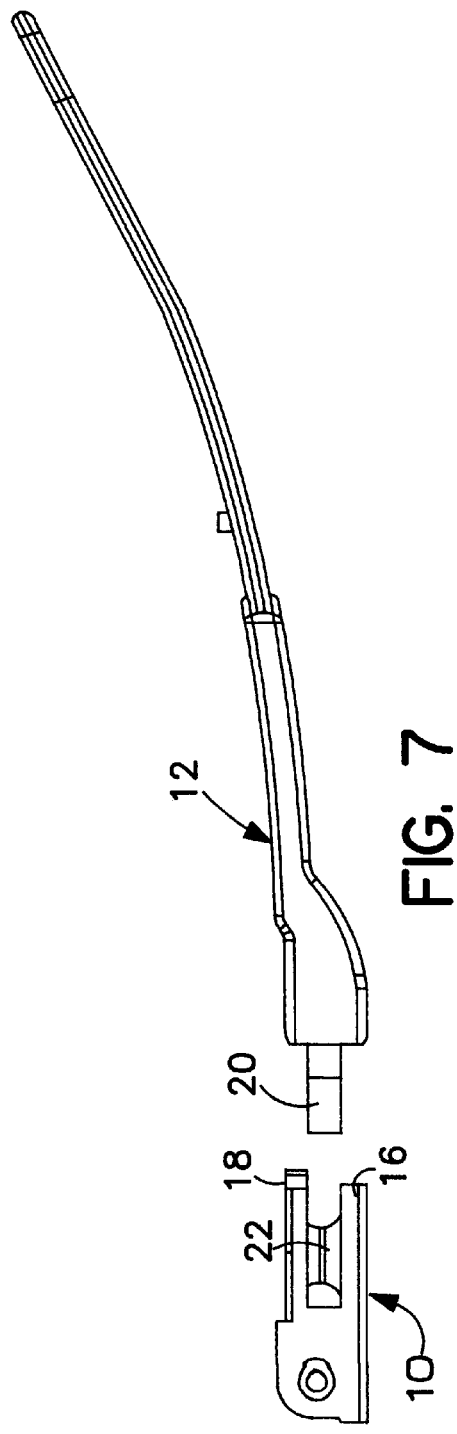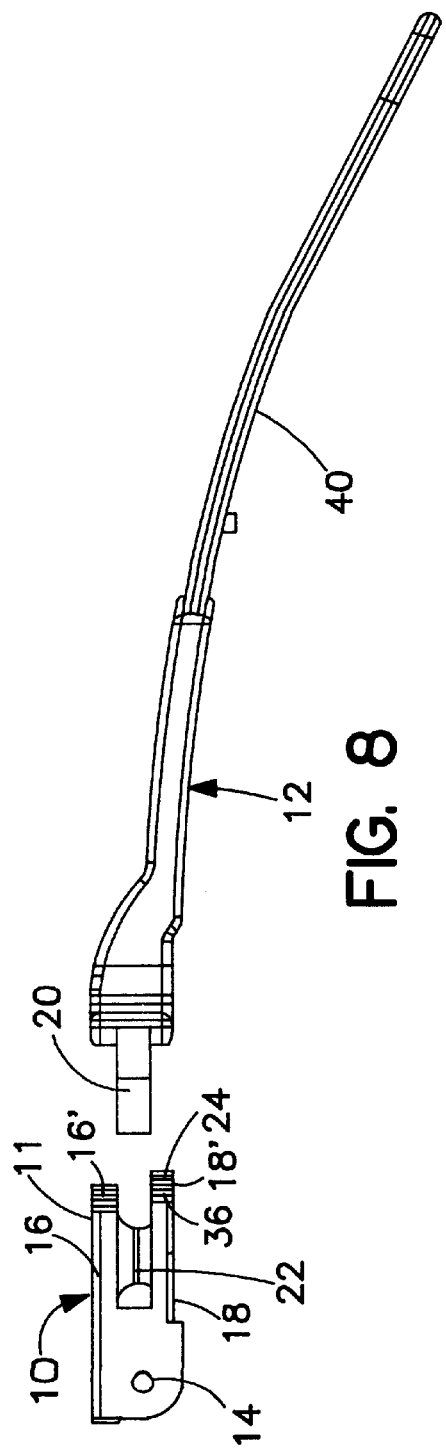

ANGULARLY ADJUSTABLE TEMPLES FOR EYEGLASSES

BACKGROUND OF THE INVENTION

This invention is directed to adjustable temples for eyeglasses and more particularly to adjustable temples which include means for retaining the temples in the adjusted position and a stop means for limiting the angular travel extent of the temple.

Heretofore eyeglasses have been provided with adjustable temples, some of which use complicated means for adjusting and holding the temples in the adjusted position. Known prior art patents are as follows: Davis U.S. Pat. No. 4,017,165; Welhelmi U.S. Pat. No. 4,986,750; Paivarinta U.S. Pat. No. 5,289,592; Yang U.S. Pat. No. 5,452,029; Lee U.S. Pat. No. 5,565,937; and Wang U.S. Pat. No. 5,661,535.

The prior art patents are generally more complicated and more expensive to manufacture than the eyeglass temples disclosed in this application. In particular, the inventive construction avoids the use of a rivet and allows for ease of assembly. Applicant is seeking to provide economical manufacture of an adjustable temple for eyeglasses and yet provide one which adjusts so as to hold the angular position assumed securely.

Applicant's invention provides for a positive stop means limiting the angular travel of the temple pieces with respect to one another, which complements an adjustment feature having a positive locking capability, thereby to hold the adjustment securely. In addition, the adjustment means provides a longer wearing adjustability feature compared much of the prior art so that the glasses so fitted do not become the victims of premature much of the prior art so that the glasses so fitted do not become the victims of premature disposal.

SUMMARY OF THE INVENTION

The invention discloses first and second temple pieces, the first piece of which includes an end portion remote from the frame hinge provided with arcuately-edged, parallel walls defining a recess having a first pin means extending therebetween for engagement with a circular recess defined between arcuate walls of a front portion of the second temple piece. The first temple piece also includes two other elements which form part of the adjustment means and the stop means. One of the parallel walls has a short pin or tang disposed on the arcuate edge thereof, which pin is adapted to interfit into a complementally formed arcuate recess in a lateral wall of the front portion of the second temple piece. Both of said parallel walls are provided with a series of teeth or ridges cut into a lower portion of the arcuate edges thereof. The front portion of the second temple piece is provided with a lower protrusion from the underside which terminates in an upwardly-directed hook means, the hook means being adapted to mate with the series of teeth in the end of first temple piece and to lock into one of the series of grooves defined between adjacent edges, so as to lock the angular orientation of the two temple pieces in a positive manner. The two temple pieces are forced into locking engagement, so that the short pin means on the first temple piece is locked into the arcuate recess in the lateral wall of the front portion of the second temple piece, while the hook means on the second combination of a pin locking into a recess and a hook means locking into a set of ridges more securely holds both pieces together, allowing means for adjustability angularly and the pin/lateral recess serving to form a stop means so that the temple pieces cannot be splayed apart too far angularly.

OBJECTS OF THE INVENTION

It is therefore an object of the invention to provide adjustable temples for a pair of eyeglasses which are easy to adjust and which will remain in the adjusted position.

Another object is to set forth adjustable temples for a pair of eyeglasses in which the temples are made into at least two pieces which are easily together and which are securely held in place for adjustment of the temples.

Still another object is to provide adjustable temples for a pair of eyeglasses which are inexpensive to make and easy to assemble.

Yet another object is to provide adjustable temples, the pats of which lock securely together without the use of a permanent rivet.

Yet an additional object is to provide a stop means for limiting the extent of angular adjustment serving as a back-up to keep the adjustment means from being defeated by the exertion of too much angular force upon the temple pieces.

Other objects and advantages of the invention will become obvious to one skilled in the art from a review of the drawings in combination with the written disclosure.

BRIEF DESCRIPTION OF THE DRAWINGS

FIG. 1 shows a front, inner side perspective view of the assembled two temple pieces into a unit;

FIG. 2 shows a rear, outside perspective view of the assembled temple pieces in a unit;

FIG. 3 shows a view from the perspective of FIG. 1 of an eyeglass temple with the pieces of the temple separated to show the different features.

FIG. 4 shows an opposite side perspective view of the eyeglass temple of FIG. 3, again in an exploded view;

FIG. 5 is an outside view of the separate temple pieces illustrating a relationship of the parts;

FIG. 6 is an opposite side view of the separate temple pieces again illustrating the relationship of the parts;

FIG. 7 shows a top view of the disassembled temple pieces to illustrate the relationships of the parts; and FIG. 8 shows a bottom view of the disassembled temple pieces to illustrate the relationship of the parts.

DETAILED DESCRIPTION OF THE DRAWINGS

Now referring to the drawings there is shown in FIGS. 1–8 different views of an eyeglass temple made in accordance with this invention. As shown, the temples are made with at least two pieces 10 and 12. The end piece 10 is provided with an end structure 14 by which the end piece can be secured to the eyeglasses frame and hinged in order to fold inwardly along the eyeglass frame. The connection means to the frame is not a part of the invention and as such will not be described further since any well known hinge connection can be used. One end of the temple piece 12 fits into the outer end of the piece 10 and is locked in place for adjustment in an up and down direction. The outer end 11 of the piece 10 has a circularly shaped bifurcated end having side pieces 16, 18 spaced apart sufficiently to receive therein a connecting end piece 20 of the piece 12. The bifurcated end pieces have a cylindrical shaft 22 which extends across the spacing between the side pieces 16 and 18 as best shown in FIGS. 7 and 8. The cylindrical shaft is substantially on an axis of the end pieces.

On a rearmost extremity of the front temple portion 10, projecting from circular side piece 18 is a short pin 24. The function of this pin is to engage a complementary recess provided on temple piece 12 when the two temple pieces are fitted together. In the assembled state, the pin/recess combination acts as a stop for the extent of angular (or pivotal) travel that temple piece 12 can make with respect to temple piece 10.

As best shown in FIGS. 3 and 4, the temple piece 12 has a partial cylindrical end 20 which has a radially extending V-shaped opening 28 that extends to a partial cylindrical opening 30. As best shown in FIGS. 3 and 6, inwardly of the opening 30 is a somewhat arcuate groove or recess 32.

In carrying out the invention, the end piece 20 fits into the space between the bifurcated end including side pieces 16 and 18. The V-shaped end of the piece 20 is formed so that the end piece 20 can more easily slide over the cylindrical shaft 22. The partial cylindrical opening 30 has a diameter which is substantially the diameter of the shaft 22 and the opening 30 is slightly larger than a semi-circle so that the shaft 22 snaps into the opening 30 and locks thereon. Thus, the shaft 22 will be retained within the opening 30 to function as a pivot point about which the end 12 can pivot to change an angle of the temple piece 12 with respect to the other portion 10, and thus also the eyeglass bridge or lens. When the two pieces are pushed together, the short pin 24 fits into the arcuate groove 32 and functions as a stop for the piece 12. When the shaft is seated in the opening 30, the short pin 24 is plugged into the arcuate groove 32 so that the short pin rides against the inner end surface of the arcuate groove 32. The recess 32 has an arcuate profile with flat end walls, so that the travel of the short pin is slightly curved, as best shown in FIG. 6, and thus the pin follows in a cam-like fashion the curved surface as the temple is pivoted about the shaft 2. The end walls 32', 32", of the recess 32 serve as upper and lower stops for the pivot travel extent of the temple pieces.

As best shown in FIGS. 5–8, a series of serrations 34 are provided on the lower portions 16' and 18' of the respective circular, parallel walls of the front temple piece. A protrusion 36, in the form of an upwardly directed hook means 38 extends from a lower extremity of the front portion of temple piece 12. When the two temple pieces are assembled together, with the shaft 22 locked into opening 30, the hook means 38 interfits into a space between adjacent ones of the series of serrations. The interfitting of those parts allows the temple piece 12 to be pivoted with respect to the front temple piece 10, thus engaging a different space between other adjacent serrations.

It is well known in the prior art that a portion of the temple shown as reference character 40 could be adjustable linearly with respect to the second temple piece so that the length of the temple could be adjusted to better fit the headsize of the wearer. Since this adjustment is well known in the art, applicant is not showing the mechanics of the adjustment.

The foregoing relates to preferred exemplary embodiments of the invention, it being understood that other variants and embodiments thereof are possible within the spirit and scope of the invention, the latter being defined by the appended claims.

I claim:

1. Angularly adjustable temples for a pair of glasses in which, each temple includes first and second temple parts (10, 12), said first part (10) includes a first end that connects with an eyeglass frame by a well known hinge pin and is adjustable relative thereto by rotation on said hinge pin, said second part (12) has an end that connects with a second end of said first part, said second end of said first part has a bifurcated end including substantially cylindrically shaped parallel spaced side pieces (16 and 18), a cylindrical shaft (22) extends between said cylindrically shaped side pieces (16 and 18) substantially along an axis perpendicular thereto, said second temple part (12) includes a partial circular shaped end (20) that fits between said side pieces (16 and 18) of said second end of said first temple part (10), said end (20) includes a radially extending V-shaped opening (28) that extends toward an axis of said end (20), said V-shaped opening (28) extends to a partial circular opening (30) that is slightly larger than a semi-circle, said partial circular opening (30) has a diameter substantially the same as a diameter of said shaft (22), and said end (20) of said second part extends into said bifurcated end of said first part between said side pieces (16 and 18) with said shaft (22) fitting into said opening (30) with a tight fit.

2. Angularly adjustable temples as set forth in claim 1, which includes, a short pin (24) connected to one edge surface of one of said bifurcated ends, said end (20) of said second part (12) includes a recess (32) disposed inwardly of said partial circular opening (30), said end (20) of said second part is guided along said shaft 22 with said short pin (24) engaged into said recess (32), in order to function as a stop which limits an angular movement of said second part relative to said first part, whereby said second part (12) can be adjusted angularly with respect to said first part.

3. Angularly adjustable temples as set forth in claim 2, in which said side pieces (16 and 18) of said bifurcated end include arcuate edge walls having lower portions, a series of serrations are applied to at least one of said lower portions, and said second temple part includes a protrusion extending from a lower frontal region thereof for engagement with said series of serrations, whereby fine adjustment of said temples angular adjustment may be made when said first and second temple parts are assembled together.

4. Angularly adjustable temples as set forth in claim 3, in which said protrusion comprises an upwardly directed hook means for engagement with selected ones of said series of serrations.

5. Angularly adjustable temples as set forth in claim 2, in which said recess (32) has an arcuate profile cut into a side region of a front portion of said second temple part (12) and said recess includes flat end walls (32', 32") defining stops for travel of said pin 24, whereby the pin (24) and recess (32) combination forms a stop for angular adjustment of said temple parts with respect to one another when said first and second temple parts are assembled together.

* * * * *